(12) United States Patent
Deliot et al.

(10) Patent No.: US 10,515,012 B2
(45) Date of Patent: Dec. 24, 2019

(54) RELATIONSHIP BASED CACHE RESOURCE NAMING AND EVALUATION

(71) Applicant: HEWLETT PACKARD ENTERPRISE DEVELOPMENT LP, Houston, TX (US)

(72) Inventors: Eric Deliot, Bristol (GB); Rycharde J. Hawkes, Bristol (GB); Luis Miguel Vaquero Gonzalez, Bristol (GB); Lawrence Wilcock, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 147 days.

(21) Appl. No.: 15/500,883

(22) PCT Filed: Sep. 3, 2014

(86) PCT No.: PCT/US2014/053825
§ 371 (c)(1),
(2) Date: Jan. 31, 2017

(87) PCT Pub. No.: WO2016/036356
PCT Pub. Date: Mar. 10, 2016

(65) Prior Publication Data
US 2017/0220469 A1    Aug. 3, 2017

(51) Int. Cl.
*G06F 12/0815*        (2016.01)
*G06F 16/955*         (2019.01)
(Continued)

(52) U.S. Cl.
CPC ...... *G06F 12/0815* (2013.01); *G06F 12/0891* (2013.01); *G06F 12/121* (2013.01); *G06F 16/9566* (2019.01); *G06F 16/9574* (2019.01)

(58) Field of Classification Search
CPC ............ G06F 12/0815; G06F 12/0891; G06F 12/121; G06F 16/9574; G06F 16/9566
See application file for complete search history.

(56) References Cited

U.S. PATENT DOCUMENTS 6,256,712 B1    7/2001 Challenger et al.
6,934,720 B1    8/2005 Jacobs et al.
(Continued)

OTHER PUBLICATIONS

Dieter Buehler and Thomas Hurek, "Performance Tuning of Portal Access Control," Aug. 24, 2005, pp. 1-11, IBM, Available at: <ibm.com/developerworks/websphere/library/techarticles/0508_buehler/0508_buehler.html>.
(Continued)

*Primary Examiner* — Eric Cardwell
(74) *Attorney, Agent, or Firm* — Hewlett Packard Enterprise Patent Department

(57) ABSTRACT

In one implementation, relationship based cache resource naming and evaluation includes a generate engine to generate a name for a resource being added to a cache, including a plurality of resources, based on a plurality of parameters of a query including an input resource from which the resource is derived, a workflow of the operations to perform to the input resource to generate the resource, and a context associated with the query. In addition, the system includes an evaluate engine to evaluate, in response to an event, each of the plurality of resources and the named resource related to the event.

7 Claims, 4 Drawing Sheets

(51) Int. Cl.
*G06F 16/957* (2019.01)
*G06F 12/0891* (2016.01)
*G06F 12/121* (2016.01)

(56) References Cited

U.S. PATENT DOCUMENTS

| | | | |
|---|---|---|---|
| 7,017,014 B2* | 3/2006 | Cuomo | G06F 12/0815 |
| | | | 711/118 |
| 7,613,882 B1 | 11/2009 | Akkawi et al. | |
| 8,713,077 B2 | 4/2014 | Kazar et al. | |
| 8,996,687 B2* | 3/2015 | Zadig | H04L 12/66 |
| | | | 709/224 |
| 2002/0116583 A1 | 8/2002 | Copeland et al. | |
| 2004/0193620 A1 | 9/2004 | Cheng et al. | |
| 2006/0149757 A1 | 7/2006 | Bird et al. | |
| 2010/0049693 A1 | 2/2010 | Cao et al. | |
| 2014/0172956 A1 | 6/2014 | Varney et al. | |
| 2014/0229513 A1* | 8/2014 | Shiell | G06F 16/162 |
| | | | 707/803 |

OTHER PUBLICATIONS

International Search Report and Written Opinion, International Application No. PCT/US2014/053825, dated May 29, 2015, pp. 1-9, KIPO.

B. Barla Cambazojlu et al., "A Refreshing Perspective of Search Engine Caching," Apr. 2010, pp. 181-190, ACM.

Roi Blanco et al., "Caching Search Engine Results over Incremental Indices," Apr. 2010, pp, 1065-1066, ACM.

Sadiye Alici et al., "Adaptive Time-to-Live Strategies for Query Result Caching in Web Search Engines," 2012, pp. 401-412, Springer-Verlag Berlin Heidelberg.

Xiao Bai and Flavio P. Junqueira, "Online Result Cache Invalidation for Real-Time Web Search," 2012, pp. 641-540, ACM.

* cited by examiner

RELATIONSHIP BASED CACHE RESOURCE NAMING AND EVALUATION

BACKGROUND

A cache can be defined as a component that stores resources (e.g., data) so that future requests for those resources can be served faster. The resources stored in a cache can include data sets derived from backend resources (e.g., resources originating from a backend system, resources from a separate server from the cache, original values, etc.), duplicates of backend resources in the cache, and/or data sets derived from other derived resources in the cache. A cache can be server based and/or can have a limited amount of resource capacity. Managing the amount of resources in a cache can include adding, invalidating, and/or updating resources in the cache.

DETAILED DESCRIPTION

Figure 1:
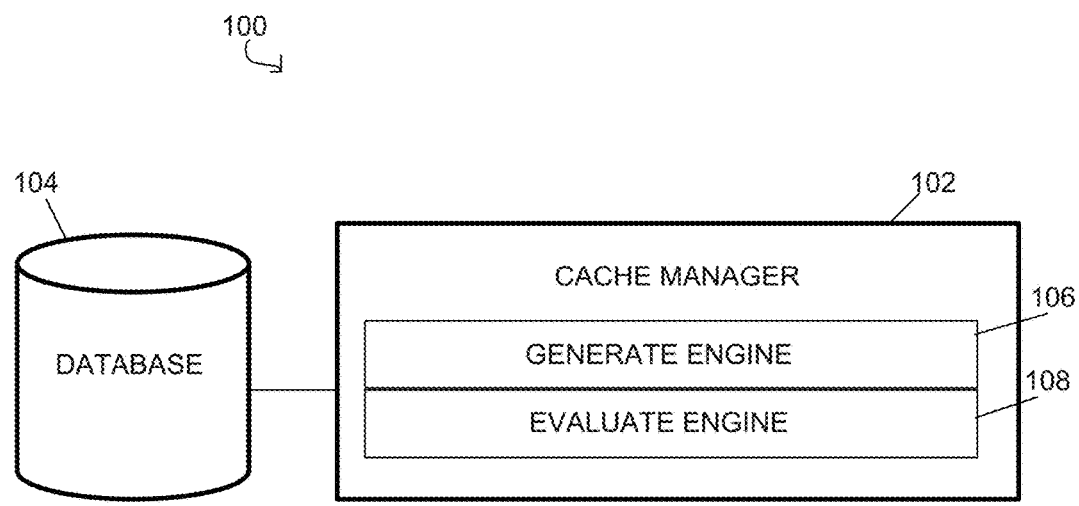
FIG. 1 illustrates a diagram of an example of a system for relationship based cache resource naming and validity evaluation according to the present disclosure.

A cache can be used to store resources in order to promote comparatively faster future access to those resources and/or comparatively reduce the demand on an enterprise's bandwidth in accessing those resources in the future as compared to approaches that do not utilize a cache(s). The cache can be maintained on or by a cache server. The cache server can include a cache engine that intercepts and saves resources into the cache and monitors the freshness (e.g., how up-to-date the resource is, how frequently the resource is accessed, the continued usefulness of the data, etc.) of the resources.

Some caching methods may be focused on unidirectional data (e.g., where the user is a mere consumer of the information that is generated elsewhere). For example, caching methods may include cashes incorporated in Web search engines. Updates of such caches may be done periodically to incorporate changes in the Web. The search result of a cache query may change according to the corpus of the search engine. The resources may be located in a cache using a universal identifier (e.g., uniform resource locator (URL)). A querying device may not directly control or influence when the content is replaced in the Web cache.

Batch and/or incremental update techniques may be used to update Web search cache results. A batch update technique can include updating all the cached resources when documents are added, modified, and/or deleted. An interval to produce a new version of the cache is often related to the size of the resources and can vary from hours to days. An incremental update technique can include periodically inputting changes to a cache. However, such incremental updating may reduce the time to introduce new resources to minutes or hours, for example, at the expense of slower access to the cache while the updates happen. Regardless of technique, the staleness of the cached resources can render the cache an inappropriate mechanism to provide sufficiently fresh resources. Setting a relatively short time to live for cache resources may be applicable with massive caches, but it results in a relatively significant amount of stale resources being served. Setting a per query time to live is another technique that seems to alleviate some staleness but is detrimental to the scalability of the cache. Keeping only the most relevant resources in the cache is yet another technique that reduces the impact of stale results but is a computationally costly technique that scales linear with the size of the cache, rendering it relatively impractical in large scale scenarios.

In contrast, embodiments of the present disclosure describe a system, method, and computer readable medium for relationship based cache resource naming and validity evaluation. For example, relationship based cache resource naming and validity evaluation can include generating a name for a resource being added to a cache, including a plurality of resources, based on a number of parameters of a query and evaluating, in response to an event (e.g., a new virtual machine is added to a cloud causing a cached fundamental resource and all the derived resources having a relationship therewith to become inaccurate, incomplete and/or erroneous, etc.), each of the plurality of resources and the named resource to determine validity based on a relationships to an event resources associated with the event.

In an example, relationship based cache resource naming and validity evaluation according to the present disclosure can be utilized with big data analytic applications. Big data analytic applications are growing in their utilization and capabilities. As used herein, big data analytic applications include applications that can process and examine large amounts of data resources of a variety of types. For example, a big data analytic application can process, store, and examine terabytes of data regarding performance metrics of all physical machines, virtual machines, and/or applications for a cloud service provider. Analysis of the resources can produce patterns, correlations, predictions, trends, and a multitude of other useful information in understanding the large amount of data resources.

Big data analytic applications can facilitate a querying device interacting and affecting a relatively large amount of data resources. The resources can include original immutable backend data resources from backend systems (e.g., fundamental resources), data resources from a cloud infrastructure, data resources from physical machines, data resources from virtual machines, data resources from services, data resources from a cloud hypervisor, data resources from profilers, mutable data resources accessible to and/or created by a querying device, and/or derived data resources that are derived from original immutable backend data resources from backend systems. As used herein, immutable data resources are data resources that cannot be modified by a querying device. That is not to say that an owner and/or originator of the data is not able to modify the data resources, but from the perspective of the querying device the data is immutable. Since multiple querying devices can be utilized with big data applications, a particular data resource may be mutable to one querying device (e.g., the originator, owner, or permitted modifier of the data) while being immutable to another querying device. Big data analytic applications can facilitate a querying device performing a number of operations on the resources. The operations can include mathematical operations, merging operations, filtering operations, statistical analysis, drill down analysis, time series analysis, etc.

Big data analytic applications can include stringent response restraints (e.g., latency considerations in milliseconds) while including massive resource caches. Further, in contrast to Web search engines, big data analytic applications allow the querying device to generate derived resources via their query to add to the cache. For example, a querying device can specify a resource (e.g., a derived resource, an original back end resource, etc.) and an operation(s) and/or transformations to perform to that resource to generate a derived resource. In one example, the querying device can request that an input resource is filtered (e.g., filter an input resource of the operability of all traffic lights in the state of New York is to only show the operability of traffic lights in Syracuse, N.Y.). In another example, the querying device can request that a derived resource is merged with an input resource (e.g., merge the operability of the traffic lights in Syracuse, N.Y. with a report of all the traffic accidents in Syracuse, N.Y.). In another example, the querying device can request that a derived resource undergo statistical analysis (e.g., generate an average quantity of traffic accidents within a particular proximity of each traffic light exhibiting a particular type of operability).

Each of the queries can generate a derived resource that can then be saved in a cache and used for later processing. That is, a big data analytic application query is not just a passive means to get information as is the Web search engine query. The big data analytic application query is analytic and can involve processing resources to derive new resources.

A data cache can be utilized in order to meet the stringent response times associated with big data analytic application query calls. Managing a data cache for such applications can involve naming derived resources that are placed into the cache and adding/invalidating/updating/deleting/relocating cache resources.

Figure 2:
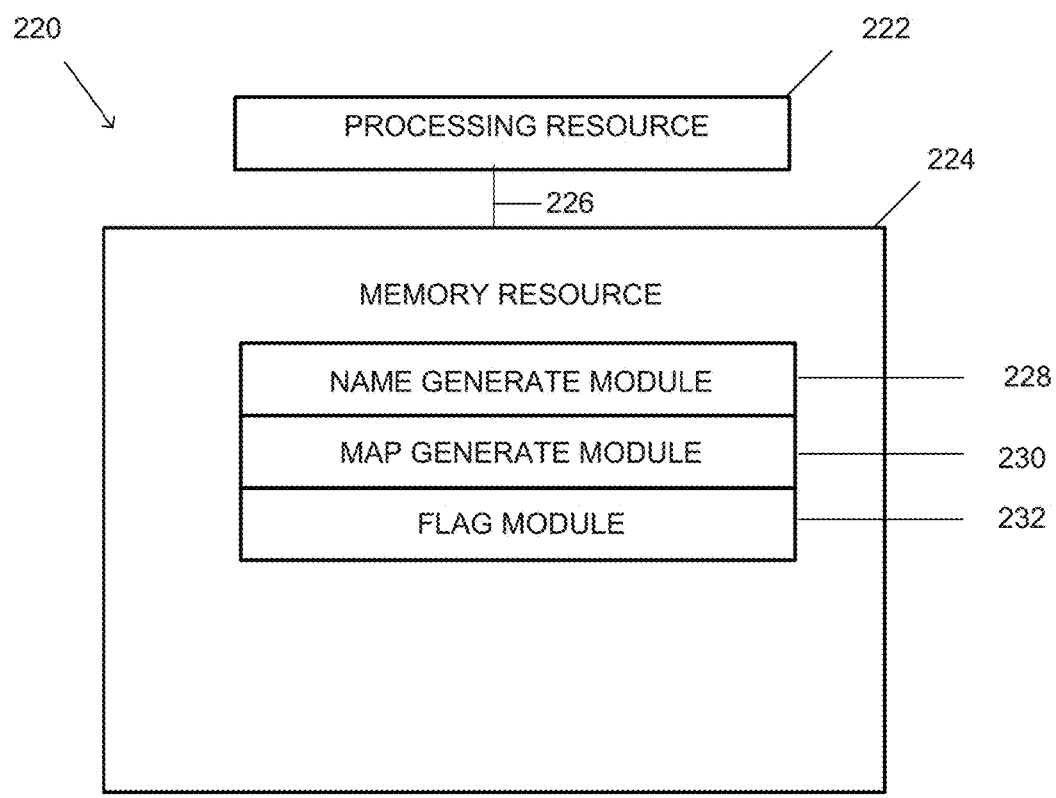
FIG. 2 illustrates a diagram of an example of a computing device according to the present disclosure.

FIGS. 1 and 2 illustrate examples of system 100 and computing device 220 according to the present disclosure. FIG. 1 illustrates a diagram of an example of a system 100 for relationship based cache resource naming and validity evaluation according to the present disclosure. The system can include a database 104, a cache manager 102, and/or a number of engines (e.g., generate engine 106, evaluate engine 108). The cache manager 102 can be in communication with the database 104 via a communication link, and can include the number of engines (e.g., generate engine 106, evaluate engine 108). The cache manager 102 can include additional or fewer engines than are illustrated to perform the various functions as will be described in further detail.

The number of engines (e.g., generate engine 106, evaluate engine 108) can include a combination of hardware and programming, but at least hardware, that is to perform functions described herein (e.g., generate a name for a resource being added to a cache, including a plurality of resources, based on a number of parameters of a query including an input resource from which the resource is derived, a workflow of the operations to perform to the input resource to generate the resource, and a context associated with the query, etc.). The programming can include program instructions (e.g., software, firmware, etc.) stored in a memory resource (e.g., computer readable medium, machine readable medium, etc.) as well as hard-wired program (e.g., logic).

The generate engine 106 can include hardware and/or a combination of hardware and programming, but at least hardware, to generate a name for a resource. The resource can be a derived resource. As used herein, a derived resource can include a resource that is derived from an input resource.

As used herein, an input resource can include a resource within the cache and/or a resource outside of the control of the cache that is separate from the derived resource. The input resource can be a resource that was previously derived from another resource within the cache and/or a resource outside of the cache. The input resource itself can be a derived resource.

The input resource can be a fundamental resource. As used herein, a fundamental resource includes original (e.g., unmodified by the querying device and/or a query) and/or immutable data. For example, the data of the input resource is not modifiable by the querying device, but the input resource can be utilized as an input for transformation into a derived resource while leaving the input resource itself unmodified. The input resource, for example, can be a stock price received from the New York Stock Exchange (NYSE). A stock price from the NYSE is not modifiable by the querying device, assuming that the querying device does not have these permissions (e.g., not a querying device associated with the NYSE that has permissions to alter stock price reports).

However, the stock price can be input into a transformative operation resulting in a derived resource (e.g., a statistical examination of stock performance in relation to internal performance metrics for the company) that has incorporated the input resource of the stock price while leaving the stock price input itself unaltered (e.g., the stock price quote is still the same value regardless of importing that value into a transformative operation to yield a derived resource).

The input resource can be a backend resource originating from a backend system (e.g., residing on a server separate from the query device server, residing on a server separate from a cache server, residing on a remoter server, etc.). As used herein, deriving the derived resource can include performing an operation to the input resource to transform the input resource to generate the derived resource. The input resource and the operation can be specified by a query. In this manner, the derived resource can be query generated. For example, by submitting the query the querying device causes the derived resource to be generated from the specified input resource by performing the specified operations to the input resource.

The generated resource can be added to a cache. The cache can include a cache server that stores a plurality of resources so that future query calls for the resources are served comparatively faster than by retrieving and/or generating the called resource anew each time. The generate engine 106 can include hardware and/or a combination of hardware and programming, but at least hardware, to generate a name for a resource that is being added to the cache. The name generated for a resource can be based on a plurality of parameters of a query. As used herein, parameters of a query can be components of a query received from a querying device. The parameters can be parameters that are part of a structured query of a data set through, for example, a big data analytics application. The parameters can be selected from a range of parameters provided to the querying device and/or can be received in a standard format. In some examples, the query can be processed utilizing an application on the cache server.

A query parameter can include a designation of the input resource from which the resulting generated resource is derived, a workflow (e.g., a chain of operations, a sequential set of operations, a non-sequential set of operations, etc.) of operations to perform to the input resource to generate the resource, and a context (e.g., a permission, location, time of day, etc.) associated with the query. Generating a name for a resource being added to the cache can include generating a name based, at least partially, on the plurality parameters of the query including the input resource from which the resource is derived, the workflow of the operations to perform to the input resource to generate the resource, and the context associated with the query. The name of the resource can be used as an index to the complete contextual information (e.g., the query parameters) used by the query to construct the derived resource. The identification within the index of query parameters such as the input resources can be used to generate a relationship graph of dependencies between the resources.

The evaluate engine 108 can include hardware and/or a combination of hardware and programming, but at least hardware, to evaluate the validity of a plurality of resources in the cache. Evaluating the validity can include validation of cached entries upon a modification and/or reevaluation of derived resources subsequent to validation. Evaluating the validity of the resources in the cache can include evaluating, in response to an event, only the validity of each of the plurality or resources of the cache and the named resource related to the event. The resources in the cache can include mutable and/or immutable resources that are original and/or derived. The resources in the cache can include fundamental resources. The resources in the cache can also include named resources. For example, the cache can include the resources named based on a plurality parameters of a query including an input resource from which the resource is derived, a workflow of the operations to perform to the input resource to generate the resource, and a context associated with the query. Evaluating the validity of the plurality of resources can include identifying resources that are eligible for modification. For example, a resource can be invalidated and removed from the cache and/or a resource that can be updated to reflect a change in an input resource or an operation.

Evaluating validity can include determining validity of each of the plurality of resources and the named resource related to an event. As used herein, a resource is related to an event where it shares a relationship with a resource that is the subject of an event (e.g., a fundamental resource that is changed by its owner, a derived resource generated by a query containing a change in context information associated with the derived resource). The shared relationship can include relationships within a hierarchy (e.g., a derived resource that depends from a fundamental resource since it incorporates a portion of the fundamental resource data). Evaluating the validity of the resources can be performed in response to an event. The event can include a modification (e.g., addition, removal, change, update, error, deletion, destruction, interruption, etc.) to a derived resource. The modification can be a modification to an input resource (e.g., a fundamental resource) and/or another resource of the cache. Additionally, the event can include a change in the contextual information (e.g., query parameters) associated with a derived resource. Evaluating the validity can include determining which of the resources of a cache share a particular relationship with the resource that is the subject of the event. For example, determining the relationships can include determining which of the resources of the cache depend from the resource that is the subject of the event within the hierarchy of resource relationships. For resources named according to the naming convention described above, the name can uniquely identify the contextual information (e.g., query parameters) used in the query that generated the derived resource, such as the input resources. The relationships between resources can be determined based on an index including the input resource and/or the operations specified within the query. When a resource of the cache has been identified as related to an event (e.g., sharing a relationship with a resource that is the subject of an event can be flagged as potentially "dirty" (e.g., in need of a modification corresponding to the event associated with the event resource).

FIG. 2 illustrates a diagram of an example of a computing device 220 according to the present disclosure. The computing device 220 can utilize software, hardware, firmware, and/or logic to perform functions described herein.

The computing device 220 can be any combination of hardware and program instructions to share information. The hardware, for example, can include a processing resource 222 and/or a memory resource 224 (e.g., computer-readable medium (CRM), machine readable medium (MRM), database, etc.). A processing resource 222, as used herein, can include any number of processors capable of executing instructions stored by a memory resource 224. Processing resource 222 may be implemented in a single device or distributed across multiple devices. The program instructions (e.g., computer readable instructions (CRI)) can include instructions stored on the memory resource 224 and executable by the processing resource 222 to implement a desired function (e.g., generate a name for a derived resource being added to a cache, including a plurality of resources, based on a plurality of parameters of the query including an input resource from which the derived resource was derived, a workflow of operations to perform to the input resource to generate the query generated resource, and a context associated with the query; generate a map of a hierarchy of relationships among the plurality of resources and the named derived resource; flag for modification, in response to a change in a backend resource, each of the plurality of resources and the named derived resource that shares a relationship with the backend resource according to the map of the hierarchy of relationships; etc.).

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., name generating module 228, map generating module 230, flagging module 232) can include CRI that when executed by the processing resource 222 can perform functions. The number of modules (e.g., name generating module 228, map generating module 230, flagging module 232) can be sub-modules of other modules. For example, the flagging module 232 and the map generating module 230 can be sub-modules and/or contained within the same computing device. In another example, the number of modules (e.g., name generating module 228, map generating module 230, flagging module 232) can comprise individual modules at separate and distinct locations (e.g., CRM, etc.).

Each of the number of modules (e.g., name generating module 228, map generating module 230, flagging module 232) can include instructions that when executed by the processing resource 222 can function as a corresponding engine as described herein. For example, the name generating module 228 can include instructions that when executed by the processing resource 222 can function as the generate engine 106. In another example, the map generating module 230 and the flagging module 232 can include instructions that when executed by the processing resource 222 can function as the evaluate engine 108.

The name generating module 228 can include CRI that when executed by the processing resource 222 can generate a name for a query generated resource (e.g., a derived resource) being added to the cache, which includes a plurality of resources. The generated name can be based on a number of parameters of the query generating the resource. For example, the generated name can be based on an input resource from which the query generated resource is derived, a workflow of operations to perform to the input resource to generate the query generated resource, and a context associated with the query.

The map generating module 230 can include CRI that when executed by the processing resource 222 can generate a map and/or graph of a hierarchy of relationships among the plurality of resources and a named query generated resource (e.g., a derived resource). Generating a map can include tracking the hierarchy of resource relationships. For example, generating a map can include generating an index cataloging the relationships among each of the resources of the cache. The map of the hierarchy of relationships and/or the individual determination of the relationships can be based on the name of a resource. For example, the name of a query generated resource (e.g., derived resource) named according to the naming convention described above can be used to construct an index including the contextual information (e.g., the query parameters) used by the query to construct the derived resource. For example, the relationships associated with the query generated resource can be determined from the input resource and/or the specified operations input to the query, as such query parameters can describe the relation of the query generated resource to another resource. The identification within the index of query parameters such as the input resources can be used to generate a relationship graph of dependencies between the resources.

The flagging module 232 can include CRI that when executed by the processing resource 222 can flag resources in the cache for modification. Flagging a resource for modification can be performed in response to a modification of a fundamental resource (e.g., a resource originating from a backend system from which a derived resource depends). Flagging a resource can include generating an indicator that a resource of the cache shares a relationship with a fundamental resource that has been modified. Determining whether a resource of the cache shares a relationship with a fundamental resource that has been modified can be determined according to the map of the hierarchy of resource relationships. Once it has been determined that a resource of the cache shares a relationship with the fundamental resource (e.g., for example, the cache resource depends from the fundamental resource) then the cache resource can be flagged. In some examples, the cache resource identified as sharing a relationship with the fundamental resource will not be modified at the time of flagging.

Figure 3:
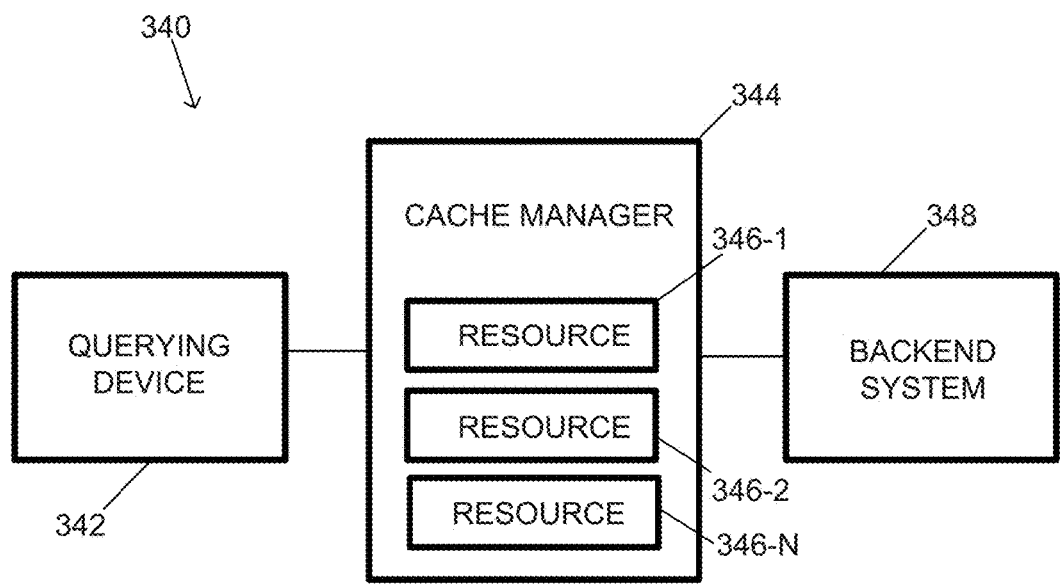
FIG. 3 illustrates an example of an environment suitable for relationship based cache resource naming and validity evaluation according to the present disclosure.

FIG. 3 illustrates an example of an environment 340 suitable for relationship based cache resource naming and validity evaluation according to the present disclosure. The environment 340 is shown to include a querying device 342, a cache 344, resources 346-1 . . . 346-N, and a backend system 348.

The environment 340 can include a querying device 342. A querying device 342 can include a device submitting and/or transmitting an analytic query. The querying device 342 can include a computing device where a user structures and submits a query. The querying device 342 can include a device submitting a query to a big data analytics application. The querying device 342 can include a search engine portion of a big data analytics application. The querying device 342 can include a signal generating device and/or a signal that can be interpreted as a structured query. The structure query can include a specification of an input resource, a workflow of operations to perform to the input resource to generate a particular resource, and/or a context associated with the query.

Portions of the query can be determined by user inputs while other portions can be determined by characteristics of the user and/or the querying device 342. For example, a specification of an input resource, a workflow of operations to perform to the input resource to generate a particular resource can be determined by a user input into the querying device 342 while the context associated with the query can be based on an identity (e.g., user name, account name, IP address, device ID, device certificate, user attribute, digital identification of the user, digital identification of the querying device 342, authentication credentials, user location, time of day, etc.) associated with the query. The context associated with the query can include an indication of a level of access to a resource (e.g., 346-1 . . . 346-N) based on the identity associated with the query. There can be a plurality of querying devices 342 with varying levels of permission. The query can be received from the querying device 342 as and/or identified by a hash of the plurality of query parameters. The hash of query parameters can include the following structure: (input resources, workflow of operations, and permissions).

The environment 340 can include a cache manager 344. The cache manager 344 can include a cache that stores resources (e.g., 346-1 . . . 346-N) (e.g., data) so that future requests for those resources can be served faster. The cache manager 344 can include a cache server and/or an application on a cache server. The cache manager 344 can include an application that can process queries, generate resources (e.g., 346-1 . . . 346-N), map relationships between resources (e.g., 346-1 . . . 346-N), flag resources (e.g., 346-1 . . . 346-N), evaluate the validity of resources (e.g., 346-1 . . . 346-N), and/or modify resources (e.g., 346-1 . . . 346-N). The cache manager 344 can be based on a device that is separate from the querying device 342 or can be on the querying device 342 itself. The cache manager 344 can be a portion of a big data analytics application. The cache manager 344 can have a predetermined limited amount of space within which to store resources (e.g., 346-1 . . . 346-N). The cache manager 344 can include an index of the resources (e.g., 346-1 . . . 346-N) stored within the cache.

The resources (e.g., 346-1 . . . 346-N) stored within the cache can include a fundamental resource (e.g., a resource that includes original immutable data from a backend system 348 outside of the direct control of the cache), immutable derived data that has been derived from resources (e.g., 346-1 . . . 346-N) stored within the cache and/or a backend resource, and/or mutable derived data that has been derived from resources (e.g., 346-1 . . . 346-N) stored within the cache and/or a backend resource. A given resource can be immutable or mutable depending on the querying device 342. For example, a given resource can be immutable to a querying device 342 utilizing the cache, but the same resource may be mutable to another querying device and/or another user of the same querying device 342) based on that querying device and/or user being an owner, originator, and/or permitted modifier of the given resource. Therefore the mutability of a data resource (e.g., 346-1 . . . 346-N) can be a matter of the perspective of the user and/or querying device 342. The resources (e.g., 346-1 . . . 346-N) can be query generated resources (e.g., derived resources). A query generated resource can be a resource that is generated as a result of a query received from the query generating device 342. For example, a query received from a query generating device 342 can include a plurality of query parameters including an input resource from which the new resource is to be derived, a workflow of operations to perform to the input resource to generate the resource, and a context associated with the query. The cache manager 344 can generate a resource (e.g., 346-1 . . . 346-N) to add to the cache based on these query parameters. For example, the cache manager 344 can perform the operations specified in the query to the input resource specified in the query to generate a derived resource to store in the cache. Alternatively, the cache manager 344 can receive and store a derived resource that was generated separate from the cache but according to the operations specified in the query.

The cache manager 344 can generate a name for a query generated resource being saved within the cache. The name can be a file name and/or other characterizing description of the resource that can be interpreted by the cache manager 344. The cache manager 344 can generate a name based on the plurality of query parameters of the query that generated the resource. For example, the cache manager 344 can name the resources based on an input resource from which the new resource was derived, a workflow of operations to perform to the input resource to generate the resource, and a context associated with the query.

The cache manager 344 can generate and/or maintain a map of the resources (e.g., 346-1 . . . 346-N) stored within the cache. For example, the cache manager 344 can generate and/or maintain a map of relationships among the resources (e.g., 346-1 . . . 346-N) within the cache. The relationships among the resources (e.g., 346-1 . . . 346-N) can include a hierarchy of relationships. A hierarchy of relationships can be modelled mathematically as a rooted tree: the root of the tree forms a top level and the children of a given vertex are at the same level, below their common parent. The hierarchy of relationships can be associated with a familial nomenclature. For example a root resource in the hierarchy tree (e.g., a input resource of a derived resource) can be a parent resource and any resource depending from that data (e.g., incorporating the input resource data) can be a child resource. Understanding where a derived resource being added to the cache fits within a hierarchy of relationships can be accomplished by examining the set of input resources used as inputs to the query that generated the derived resource. For example, the input resource can indicate where in the hierarchy of relationships the query generated resource belongs since it specifies the parent resource. Therefore the cache manager 344 can determine from the input resources that a derived resource is, for example, a child resource of the parent resource specified as the input resource in the query.

Subsequent to the generation and naming of a query generated resource, the cache manager 344 can receive additional queries. The queries can be from the same querying device 342 or from other querying devices. In some examples, a subsequent query (e.g., subsequent to a prior query) can be granted access to a full version of the named query generated resource if the subsequent query is associated with an identical context to the context associated with a query (e.g., the prior query that generated the resource). The cache manager 344 can limit the level of access (full, partial, portions, no access, etc.) granted to the named query generated resource in the cache based on the context associated with the subsequent query. For example, the cache manager 344 can limit access to a full version (e.g., all the data, a sensitive portion of the data, a confidential portion of the data, etc.) of the query derived resource to only those queries and/or querying device having an identical context to the context associated with the original query according to which the query generated resource was generated. Since many different users and/or querying devices 342 can be utilized to access the same cache, limiting access based on context allows two users and/or querying devices with the same permissions to see the same resources.

Further, the cache manager 344 can receive additional queries that include a change in the context information (e.g., the query parameters) from the prior query. If any of the query parameters of the query change this can result in a different result (e.g., different derived resource) to the query. In such instances, the name generated for the derived resource can change and any previously cached or shared (e.g., appear within a query and/or cache of a different querying device and/or separate user of the same querying device 342) results of the query can be deemed no longer relevant and/or removed from the cache and/or sharing.

The cache manager 344 can evaluate the cache resources (e.g., 346-1 . . . 346-N) to determine their validity. The cache manager 344 can evaluate the cache resources (e.g., 346-1 . . . 346-N) to determine validity in response to an event. The cache manager 344 can particularly evaluate the validity of cache resources (e.g., 346-1 . . . 346-N) related to the event. The event can include a modification to a resource. The modification to the resource can be detected by the cache manager 344 and/or by a resource monitoring application that monitors the resources (e.g., 346-1 . . . 346-N), the backend systems 348, and/or original data from other sources indicative of modifications of the resources (e.g., 346-1 . . . 346-N), The event can include an indication input from a user and/or a querying device 342 specifying an event. For example, the event can include an indication to delete a derived resource from the cache. Additionally, the event can include an indication to delete the derived resource from the cache, but to persist the derived resource in storage separate from the cache (e.g., on a storage medium associated with the querying device 342). Allowing a user and/or querying device 342 to determine that a resource (e.g., 346-1 . . . 346-N) can desirably be persisted but not stored in the cache can permit an efficient use of cache capacity without total loss of resources (e.g., 346-1 . . . 346-N).

Once an event is detected, the cache manager 344 can determine the validity of the cache resources (e.g., 346-1 . . . 346-N) based on the relationship of each of the resources (e.g., 346-1 . . . 346-N) with the event resource. For example, the cache manager 344 can flag for modification each of the resources (e.g., 346-1 . . . 346-N) that share a relationship with the event resource. In one example, a resource of the resources (e.g., 346-1 . . . 346-N) can be flagged for modification where it is a child resource of a parent event resource that has been modified (e.g., depends from a fundamental resource that has been modified). In this manner, only the resources (e.g., 346-1 . . . 346-N) that share a relationship with a modified resource and may themselves be modified by the modification are validated rather than wasting computational resources in assessing all resources of a cache regardless of relationship. The flagged resources can avoid modification at the time of flagging. However, the flagged resources can be modified according to the event (e.g., deleted if the event is the deletion of a corresponding parent resource, updated if the event is an update of a corresponding parent resource, etc.) upon a query for the flagged resources. For example, the actual modification to a resource will not be executed until a call for that resource is received in the form of a query from the querying device 342.

Once an amount of resources (e.g., 346-1 . . . 346-N) in a cache exceeds a threshold capacity for the cache a replacement calculation (e.g., a time to live calculation, a frequency of use calculation, a data freshness calculation, a continued usefulness calculation, etc.) can be utilized to identify cached resources (e.g., 346-1 . . . 346-N) for removal and/or relocation. A cache manager 344 can remove and/or relocate multiple resources (e.g., 346-1 . . . 346-N) as a single block. For example, the cache manager 344 can remove and/or relocate as set of resources (e.g., resources sharing a particular hierarchical relationship such as parent child) as though they are a single resource. In one example, if a parent resource is identified for removal by a time to live calculations, that resource and all of its children resources can be removed as a single block based on their hierarchical dependent familial relationships to the removed parent resource.

Figure 4:
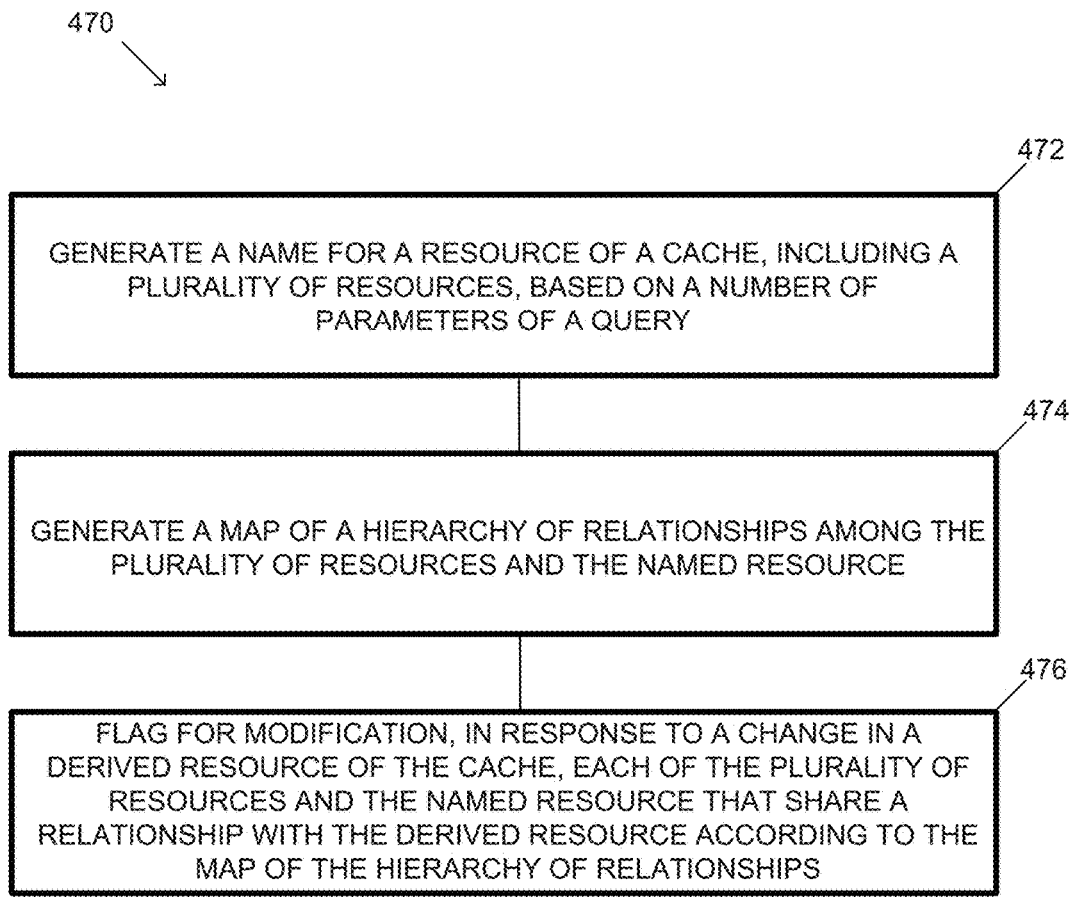
FIG. 4 illustrates a flow chart of an example of a method for relationship based cache resource naming and validity evaluation according to the present disclosure.

FIG. 4 illustrates a flow chart of an example of a method 470 for relationship based cache resource naming and validity evaluation according to the present disclosure. The method 470 can name derived cache resources based on associated query parameters, map a hierarchy of relationships among the cache resources, and flag for modification cache resources that share a relationship with an event according to the map. In some examples, the method 470 can be performed utilizing a system (e.g., system 100 as referenced in FIG. 1) and/or a computing device (e.g., computing device 220 as referenced in FIG. 2).

At box 472 the method 470 can include generating a name for a resource of a cache, including a plurality of resources, based on a plurality of parameters of a query. The plurality of parameters of a query can include an input resource from which the resource is derived, a workflow of operations to perform to the input resource to generate the resource, and a context associated with the query.

At box 474 the method 470 can include generating a map of a hierarchy of relationships among the plurality of resources and the named resource. For example, generating a map can include tracking hierarchical relationships among cache resources. A resource's name generated in accord with the above described naming convention can uniquely identify the contextual information (e.g., query parameters) used in the query that generated the derived resource. For example the name can identify the input resources, and/or the workflow of operations performed on that input resource to generate the derived resource. The set of input resources used as an input to the query can indicate where that resource belongs in the hierarchy of relationships by virtue of specifying a relationship between the derived resource and an input resource. In some examples, the name of the resource can serve as the key to a directory where the actual resource can be found. The resource itself can contain references to related children and parent resources and/or the query that generates the resource can contain references to the related children and parent resources based on inputs into the query. The references can then be used to traverse a hierarchical relationships map upon a change in a derived resource (e.g., as described at box 476). Thus, a hash of the contextual information of a query (e.g., query parameters) generating a derived resource can be used to identify its correct entry in the map of a hierarchy of relationships, thereby permitting navigation of the map of hierarchical relationships in retrieving, evaluating, and/or flagging related resources.

At box 476 the method 470 can include flagging for modification, in response to a change in a derived resource of the cache, each of the plurality of resources and the named resource that share a relationship with the derived resource. The change can include an indication from a user and/or a querying device. For example the change can include an indication from a user and/or querying device to delete a derived resource and/or to persist the derived resource outside of the cache. The resources sharing a relationship with the derived resource can be determined according to the map of the hierarchy of relationships.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
   a generate engine to generate a name for a data resource being added to a cache including a plurality of data resources, the name being generated based on a plurality of parameters of a query including: an input data resource from which the data resource is derived, a workflow of operations to perform on the input data resource to generate the data resource, and a context associated with the query; and
   an evaluate engine to evaluate, in response to an event, a validity of each of the plurality of data resources and a named data resource related to the event.

2. The system of claim 1, wherein the input data resource is a fundamental resource outside control of the cache.

3. The system of claim 1, wherein the input data resource is a derived data resource derived from a set of fundamental data resources that are immutable by a querying device.

4. The system of claim 1, wherein the query is identified by a hash of the plurality of query parameters.

5. The system of claim 1, wherein the evaluate engine is further to: flag for modification each of the plurality of data resources and the named data resource related to the event.

6. The system of claim 5, wherein each of the flagged plurality of data resources and the flagged named data resource depend from a parent data resource modified by the event.

7. The system of claim 5, wherein each of the flagged plurality of data resources and the flagged named data resource are modified according to the event upon a query for the flagged plurality of data resources and the flagged named data resource.

* * * * *